United States Patent
Zhou et al.

(10) Patent No.: US 12,519,742 B2
(45) Date of Patent: Jan. 6, 2026

(54) IMAGE DISPLAY METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Wenjun Zhou, Shenzhen (CN); Zhijie Xiao, Shenzhen (CN); Weiquan Jiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 188 days.

(21) Appl. No.: 18/221,810

(22) Filed: Jul. 13, 2023

(65) Prior Publication Data
US 2023/0362115 A1    Nov. 9, 2023

Related U.S. Application Data

(63) Continuation of application No. PCT/CN2022/104504, filed on Jul. 8, 2022.

(30) Foreign Application Priority Data

Aug. 17, 2021  (CN) .......................... 202110944261.9

(51) Int. Cl.
*H04L 51/046* (2022.01)
*G06F 3/0481* (2022.01)
(Continued)

(52) U.S. Cl.
CPC .......... *H04L 51/046* (2013.01); *G06F 3/0481* (2013.01); *G06F 3/0484* (2013.01); *G06F 9/451* (2018.02); *G06F 2203/04803* (2013.01)

(58) Field of Classification Search
None
See application file for complete search history.

(56) References Cited

U.S. PATENT DOCUMENTS

2006/0095320 A1\*  5/2006  Jones ................. G06Q 30/0253
                                                        705/14.51
2015/0033149 A1\*  1/2015  Kuchoor ............ H04N 21/4782
                                                        715/753
(Continued)

FOREIGN PATENT DOCUMENTS

CN    109151606 A    1/2019
CN    112003713 A    11/2020
(Continued)

OTHER PUBLICATIONS

Tencent Technology, Japanese Office Action, JP Patent Application No. 2023-571122, Dec. 4, 2024, 7 pgs.
(Continued)

*Primary Examiner* — Toan H Vu
(74) *Attorney, Agent, or Firm* — Morgan, Lewis & Bockius LLP

(57) ABSTRACT

This application discloses a method for displaying chat information performed by an electronic device. The method includes: displaying chat information between a first account and a second account in a chat information display region of a target application, the first account logging into the target application at the electronic device; displaying a current status of the second account at the target application; and in response to an operation instruction executed on the current status of the second account, displaying an image corresponding to the current status in the target application.

22 Claims, 16 Drawing Sheets

(51) Int. Cl.
  *G06F 3/0484* (2022.01)
  *G06F 9/451* (2018.01)

(56) References Cited

U.S. PATENT DOCUMENTS

| | | | |
|---|---|---|---|
| 2016/0227042 A1* | 8/2016 | Gray | H04M 1/72403 |
| 2020/0104015 A1 | 4/2020 | Li | |
| 2022/0060761 A1* | 2/2022 | Lundy | H04L 65/612 |
| 2022/0261936 A1* | 8/2022 | Kosarek | G06Q 50/01 |

FOREIGN PATENT DOCUMENTS

| | | |
|---|---|---|
| CN | 112714327 A | 4/2021 |
| CN | 113656133 A | 11/2021 |
| JP | 2015534676 A | 12/2015 |

OTHER PUBLICATIONS

Tencent Technology, ISR, PCT/CN2022/104504, Oct. 10, 2022, 2 pgs.
Tencent Technology, WO, PCT/CN2022/104504, Oct. 10, 2022, 5 pgs.
Tencent Technology, IPRP, PCT/CN2022/104504, Feb. 13, 2024, 6 pgs.

\* cited by examiner

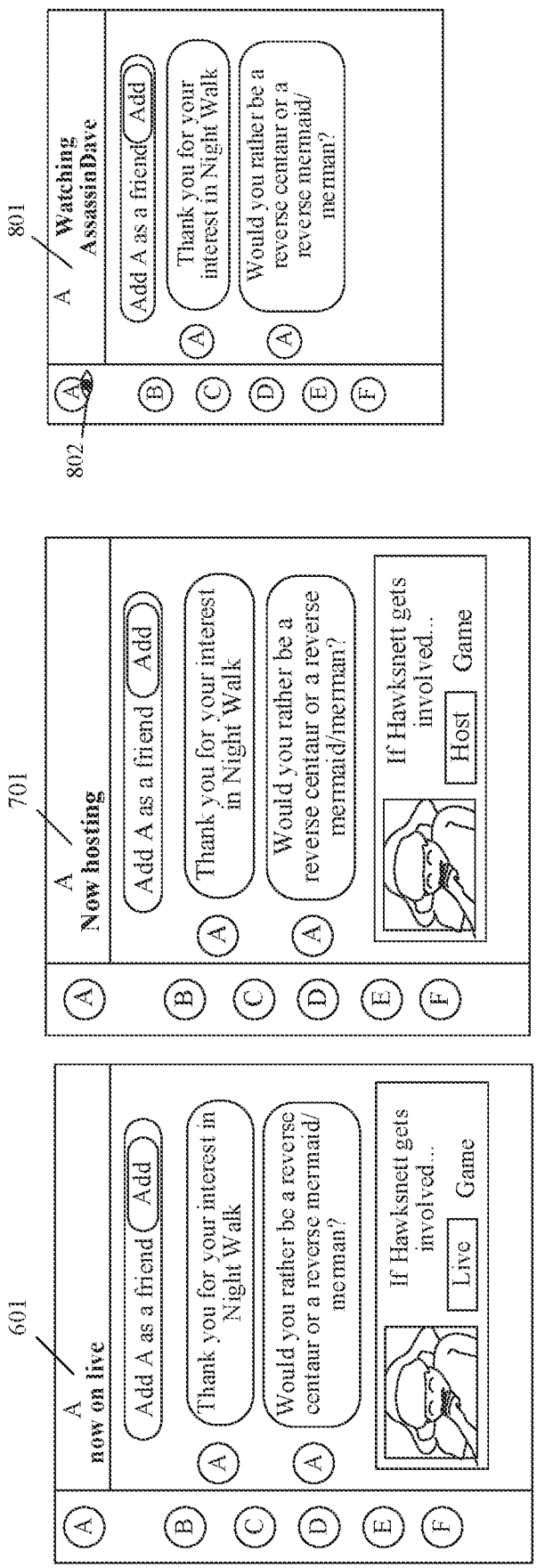

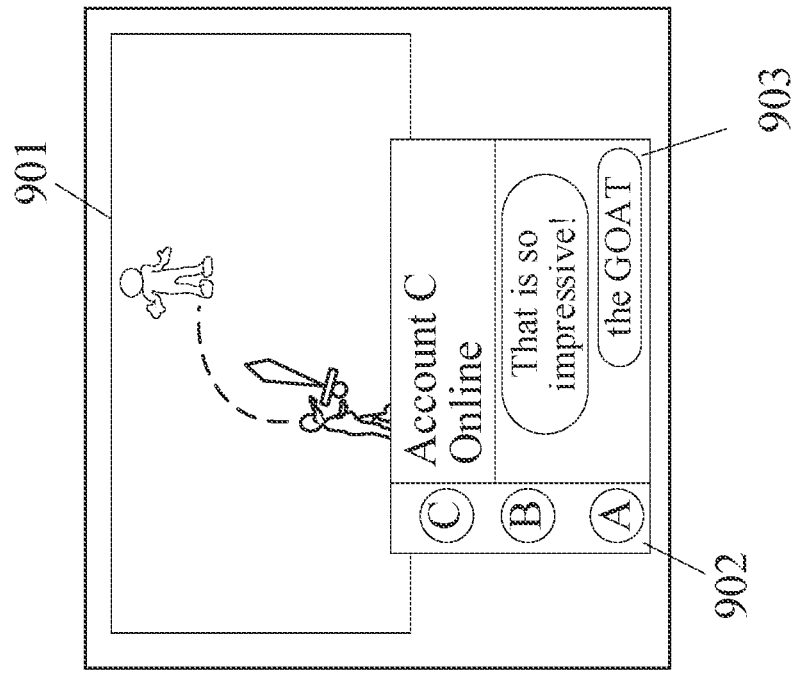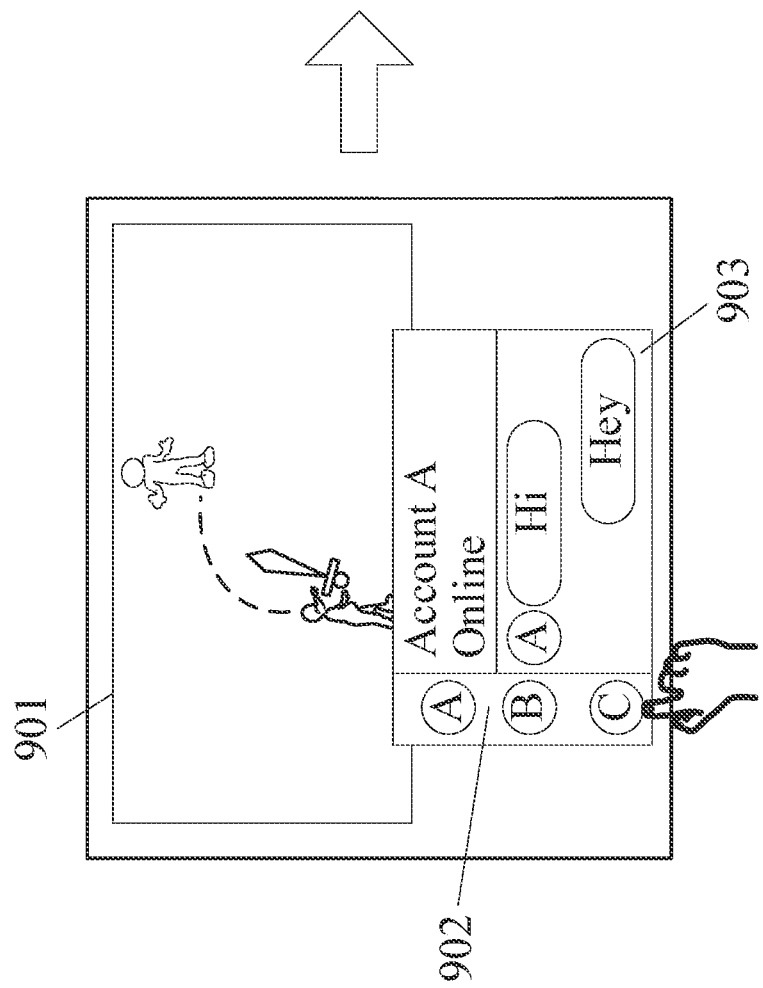
FIG. 9

IMAGE DISPLAY METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/104504, entitled "IMAGE DISPLAY METHOD AND APPARATUS, STORAGE MEDIUM, AND ELECTRONIC DEVICE" filed on Jul. 8, 2022, which claims priority to Chinese Patent Application No. 202110944261.9, entitled "IMAGE DISPLAY METHOD AND APPARATUS, STORAGE MEDIUM, AND ELECTRONIC DEVICE" filed to the China Patent Office on Aug. 17, 2021, all of which is incorporated herein by reference in its entirety.

FIELD OF THE TECHNOLOGY

This application relates to the field of computers, in particular to an image display method and apparatus, a storage medium, and an electronic device.

BACKGROUND OF TI-IE DISCLOSURE

In the related art, a chatting function has been additionally set in many applications. For example, a live stream application or a video application has the chatting function. A plurality of accounts may chat in the application while watching a live stream or a video, thus enhancing the experience of watching the live stream or the video.

However, at present, neither a status of the other account nor an image that the other account is watching may be known during a chat. Taking a chat scene of an account A and an account B in a live stream application as an example, the account A and the account B only have the chatting function in a chat page. If the account A wants to know a current status of the account B, the account A needs to chat with the account B to inquire about the current status thereof. If the account B is currently on live in a live room and the account A wants to watch a live stream image of the account B, the account A needs to inquire the account B about information of the live room and search the live stream application for the live room to enter the live room of the account B, which is complicated in operation.

Moreover, while watching the live stream or the video, an account may want to chat with a plurality of accounts simultaneously, so that the account needs to open a plurality of chat windows simultaneously. However, an application image, for example, a live stream image or a video image that the account is currently watching, may be largely covered by the plurality of chat windows. Further, in the scene where the plurality of chat windows are opened simultaneously, in order to reduce an area of the application image covered by the plurality of chat windows, a user needs to close part of the chat windows and keep one chat window. However, in this case, if the user wants to chat again with another account, the user needs to open the chat window with the account again. Due to the above-mentioned operation of first closing and then opening, the number of operation steps may be increased, and the operation efficiency may be reduced.

No effective solution has been proposed for the above-mentioned problems.

SUMMARY

Embodiments of this application provide an image display method and apparatus, a storage medium, and an electronic device, so as to at least solve the technical problem that operations of checking an image that the other account is watching during a chat are complicated.

According to one aspect of an embodiment of this application, a method for displaying chat information is performed by an electronic device and the method includes: displaying chat information between a first account and a second account in a chat information display region of a target application, the first account logging into the target application at the electronic device; displaying a current status of the second account at the target application; and in response to an operation instruction executed on the current status of the second account, displaying an image corresponding to the current status in the target application.

According to yet another aspect of an embodiment of this application, a non-transitory computer-readable storage medium is further provided. The computer-readable storage medium has a computer program stored therein that, when executed by a processor of a computer device, causes the electronic device to perform the above-mentioned method when run.

According to yet another aspect of an embodiment of this application, an electronic device is further provided. The electronic device includes a memory and a processor, the memory having a computer program stored therein that, when executed by the processor, causes the electronic device to perform the above-mentioned method by running the computer program.

BRIEF DESCRIPTION OF THE DRAWINGS

The accompanying drawings are included here to provide a further understanding of this application and constitute a part of this application. The exemplary, embodiments of this application and the description thereof are used for explaining this application and do not constitute an undue limitation to this application. In the figures:

FIG. 6 is a fourth schematic diagram of an image of a target application according to an embodiment of this application.

FIG. 7 is a fifth schematic diagram of an image of a target application according to an embodiment of this application.

FIG. 8 is a sixth schematic diagram of an image of a target application according to an embodiment of this application.

FIG. 9 is a seventh schematic diagram of an image of a target application according to an embodiment of this application.

DESCRIPTION OF EMBODIMENTS

In order to enable a person skilled in the art to better understand the solutions of this application, a clear and complete description of the technical solutions in the embodiments of this application is provided below with reference to the accompanying drawings in the embodiments of this application. Apparently, the described embodiments are only a part of the embodiments of this application, rather than all the embodiments. Based on the embodiments of this application, all other embodiments obtained by a person of ordinary skill in the art without making creative work shall fall within the scope of protection of this application.

The terms "first", "second", and the like in the description, the claims and the above-mentioned drawings of this application are used for distinguishing between similar objects and not necessarily for describing a particular sequential or chronological order. Data so used is interchangeable under appropriate circumstances such that the embodiments of this application described herein may be implemented in sequences other than those illustrated or described herein. Moreover, the terms "include" and "have", and any variation thereof, are intended to cover a non-exclusive inclusion, for example, a process, method, system, product, or device that includes a list of steps or elements is not necessarily limited to those steps or elements expressly listed, but may include other steps or elements not expressly listed or inherent to such process, method, product, or device.

Figure 1:
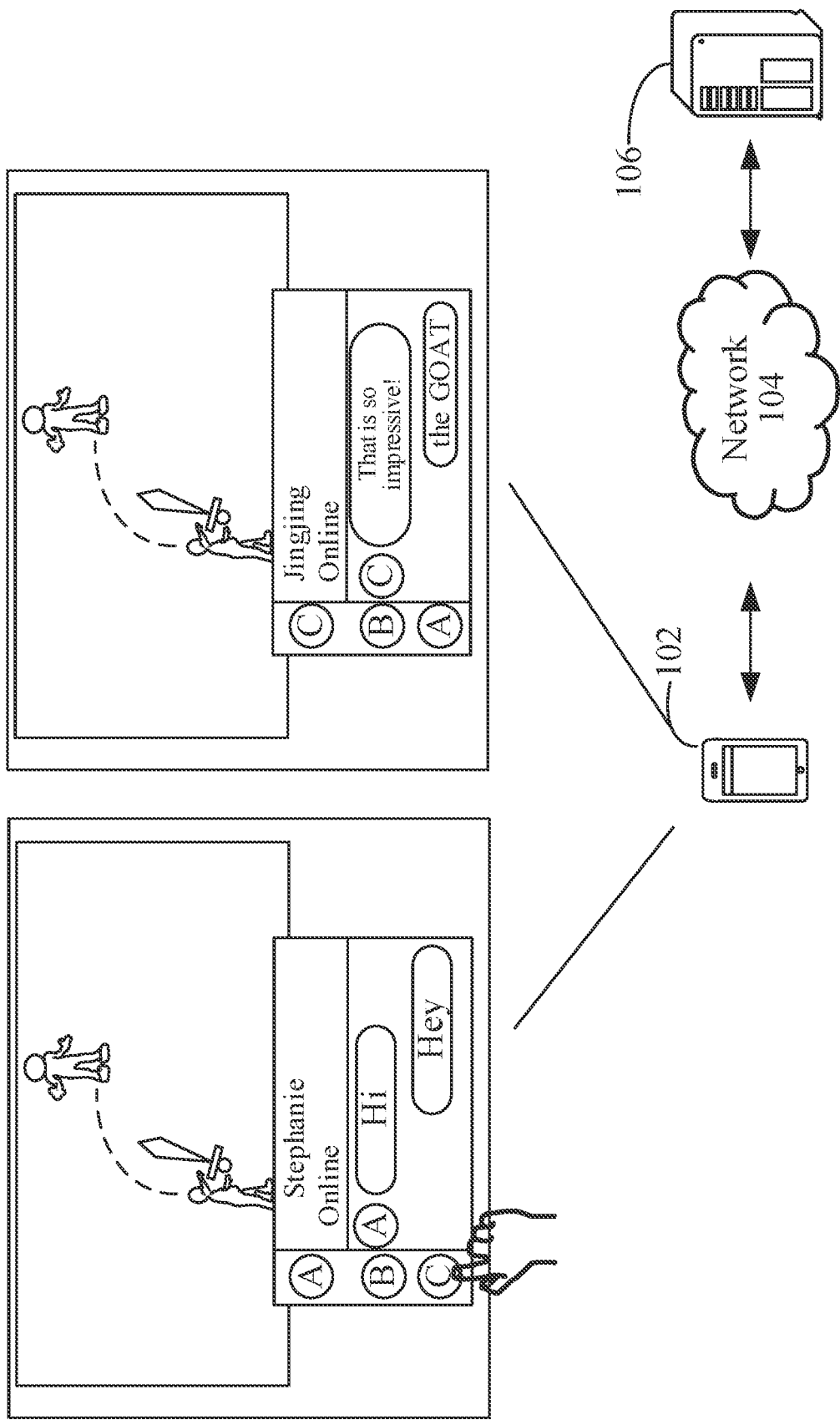
FIG. 1 is a schematic diagram of an application environment of an image display method according to an embodiment of this application.

According to one aspect of an embodiment of this application, an image display method is provided. As one implementation, the image display method may, but is not limited to, be applied to an application environment as shown in FIG. 1. The application environment includes: a terminal device 102, a network 104, and a server 106.

In this embodiment, the terminal device 102 may be a terminal device configured with a target client, and may include, but is not limited to, at least one of the following: a mobile phone (such as an Android mobile phone and an iOS mobile phone), a notebook computer, a tablet computer, a palmtop computer, a mobile Internet device (MID), a PAD, a desktop computer, a smart television, etc. The target client may be a live stream client, a video client, a browser client, an education client, etc. The target client has a chatting function.

The network 104 may include, but is not limited to: a wired network and a wireless network. The wired network includes: a local area network, a metropolitan area network, and a wide area network. The wireless network includes: Bluetooth, WIFI, and other networks that enable wireless communications.

The server 106 may be a single server, or a cluster of a plurality of servers, or a cloud server. The above is merely an example and is not limited in any way in this embodiment.

Figure 2:
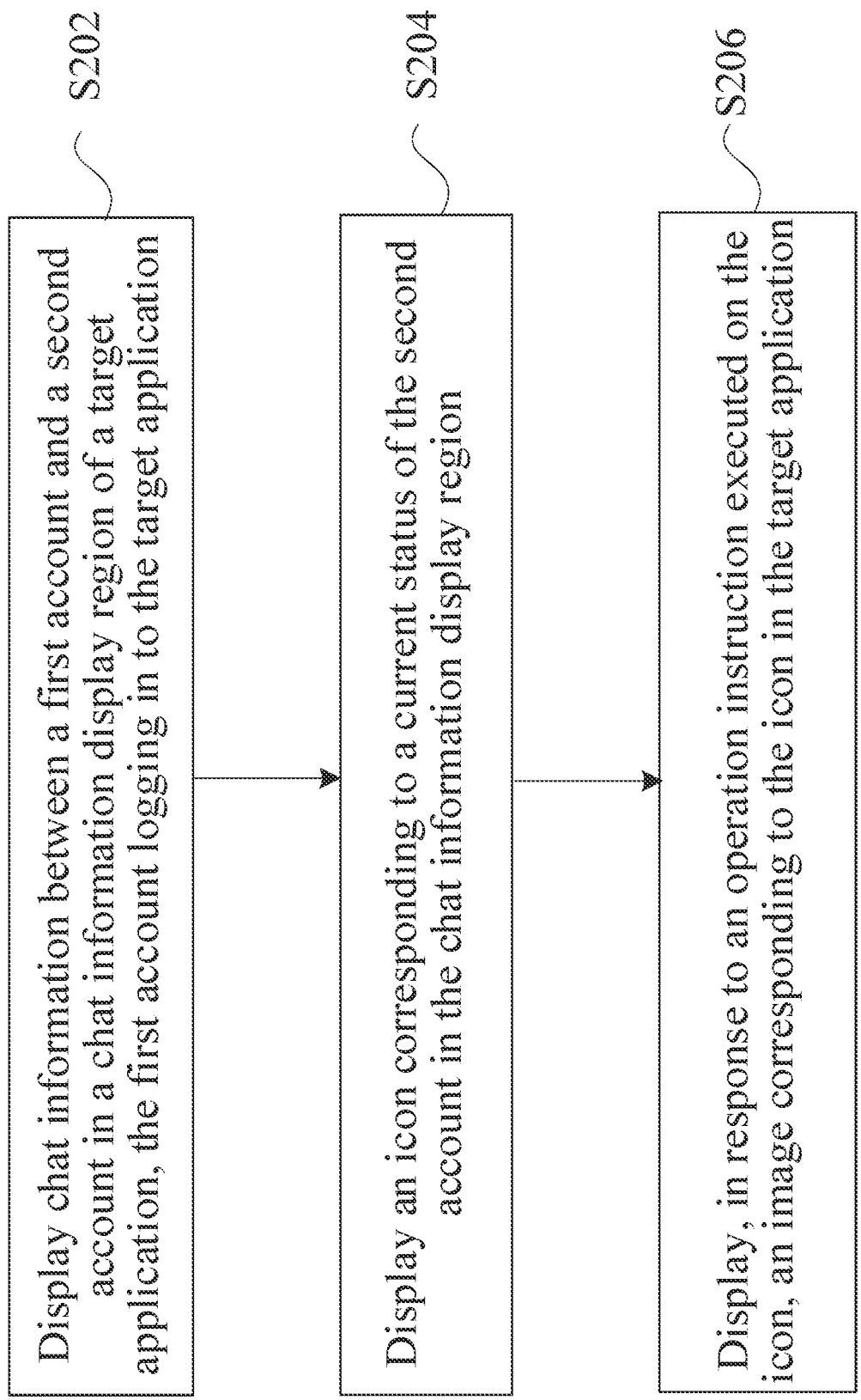
FIG. 2 is a flowchart of an image display method according to an embodiment of this application.
Figure 19:
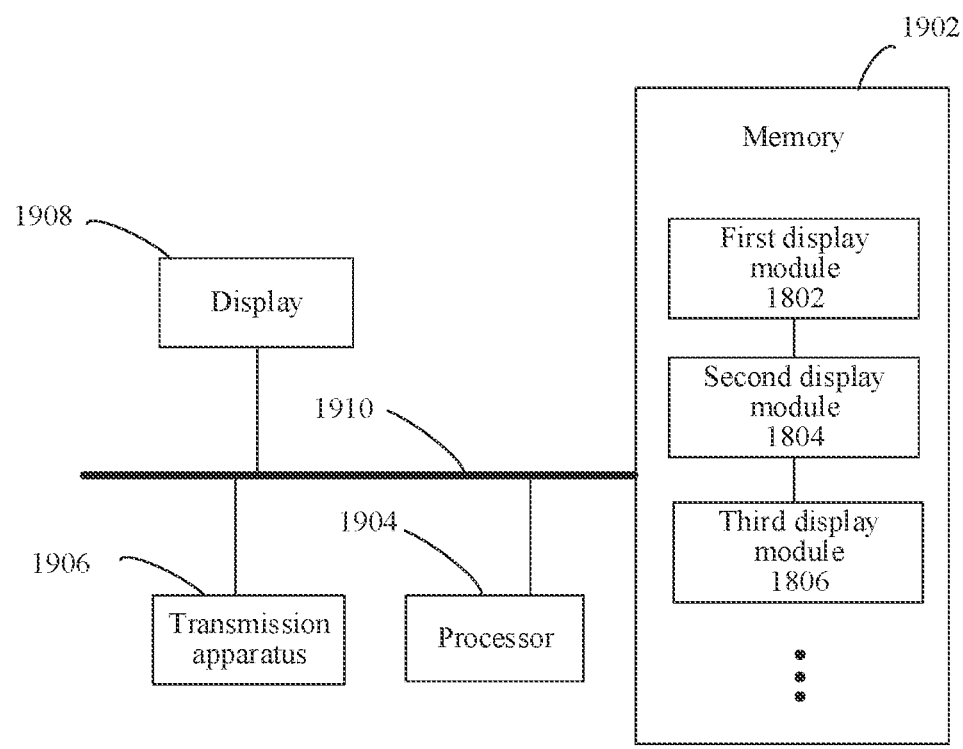
FIG. 19 is a schematic structural diagram of an electronic device according to an embodiment of this application.

As one implementation, as shown in FIG. 2, the above-mentioned image display method may be performed by an electronic device shown in FIG. 19, and includes the following steps:

Step S202. Display chat information between a first account and a second account in a chat information display region of a target application, the first account logging into the target application.

The target application refers to an application installed on the electronic device shown in FIG. 19, for example, the target application may be a live stream application client or a video application client, and the first account logs in to the target application. A target chat panel includes an account display region and the chat information display region. The account display region is used for displaying accounts chatting with the first account, and there may be a plurality of accounts chatting with the first account. The chat information display region is used for displaying the chat information between the first account and the second account chatting therewith.

Step S204. Display an icon corresponding to a current status of the second account in the chat information display region.

The current status includes, but is not limited to, a livestreaming status, a hosting status, and a status of watching a live stream.

Step S206. Display, in response to an operation instruction executed on the icon, an image corresponding to the icon in the target application.

The displaying an icon corresponding to a current status of the second account in the chat information display region includes: display, when the second account is a live stream account of a first live room and the second account is currently in the livestreaming status, a first link for jumping to the first live room in the chat information display region; or display, when the second account is currently in the hosting status, a second link for jumping to an image hosted by the second account in the chat information display region; or display, in the case that the second account is currently watching a second live room, a third link for jumping to the second live room in the chat information display region. In this application, the terms "hosting" and "broadcasting" are used interchangeably, referring to the situation in which the second account shares the livestream content from the first live room with other accounts.

The displaying, in response to an operation instruction executed on the icon, an image corresponding to the icon in the target application includes: display, in response to a first operation instruction executed on the first link, a live stream image of the first live room in the target application; or, display, in response to a second operation instruction executed on the second link, the image hosted by the second account in the target application; or, display, in response to a third operation instruction executed on the third link, a live stream image of the second live room in the target application.

Figure 3:
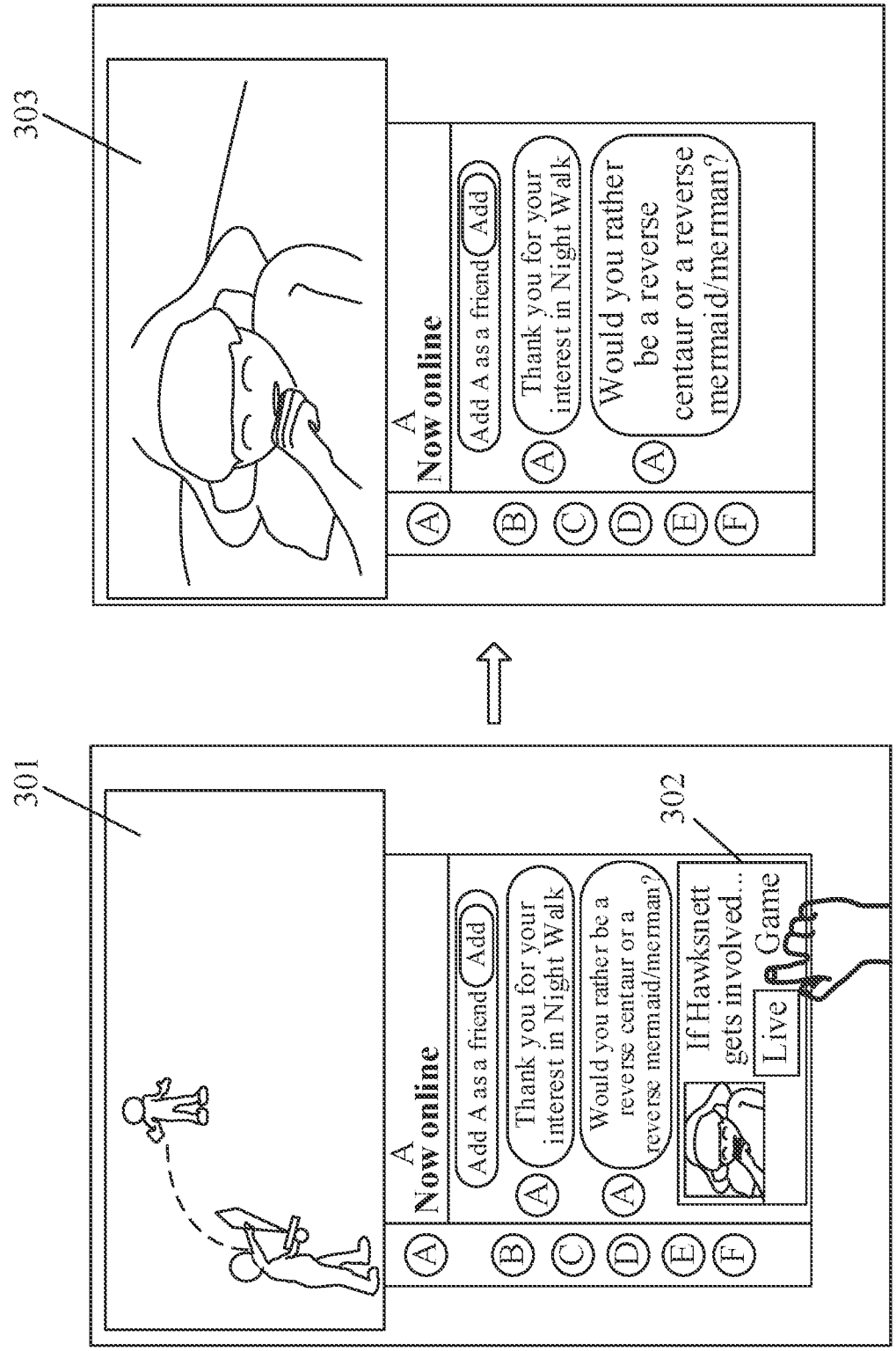
FIG. 3 is a first schematic diagram of an image of a target application according to an embodiment of this application.

As one implementation, if the second account is currently in the livestreaming status, the first link to the first live room where the second account is currently on live is displayed in the chat information display region for the first account and the second account. As shown in FIG. 3, which is a first schematic diagram of an image of the target application according to an embodiment of this application, the live stream image 301 of a current live stream is displayed on the image of the target application, the first link 302 is displayed in the chat information display region, and the first link also displays that a status of a live stream linked by the first link is now on live, denoted by Live. The first link may further include a thumbnail of the live stream of the second account, a live title and a game category, etc. Automatic jumping to a live room image 303 corresponding to the first link is achieved by clicking the first link, and the first link disappears after the live stream is offline. A user logging in to the live stream application client with the first account performs an operation on the first link, for example, a touch operation and a click operation. In response to the operation, the live stream image of the first live room corresponding to the first link 302 is displayed in the live stream application client. In this embodiment, by displaying the first link to the live stream where the second account is currently on live in the chat information display region, the accounts may share live stream contents conveniently, and the user experience is enhanced.

Figure 4:
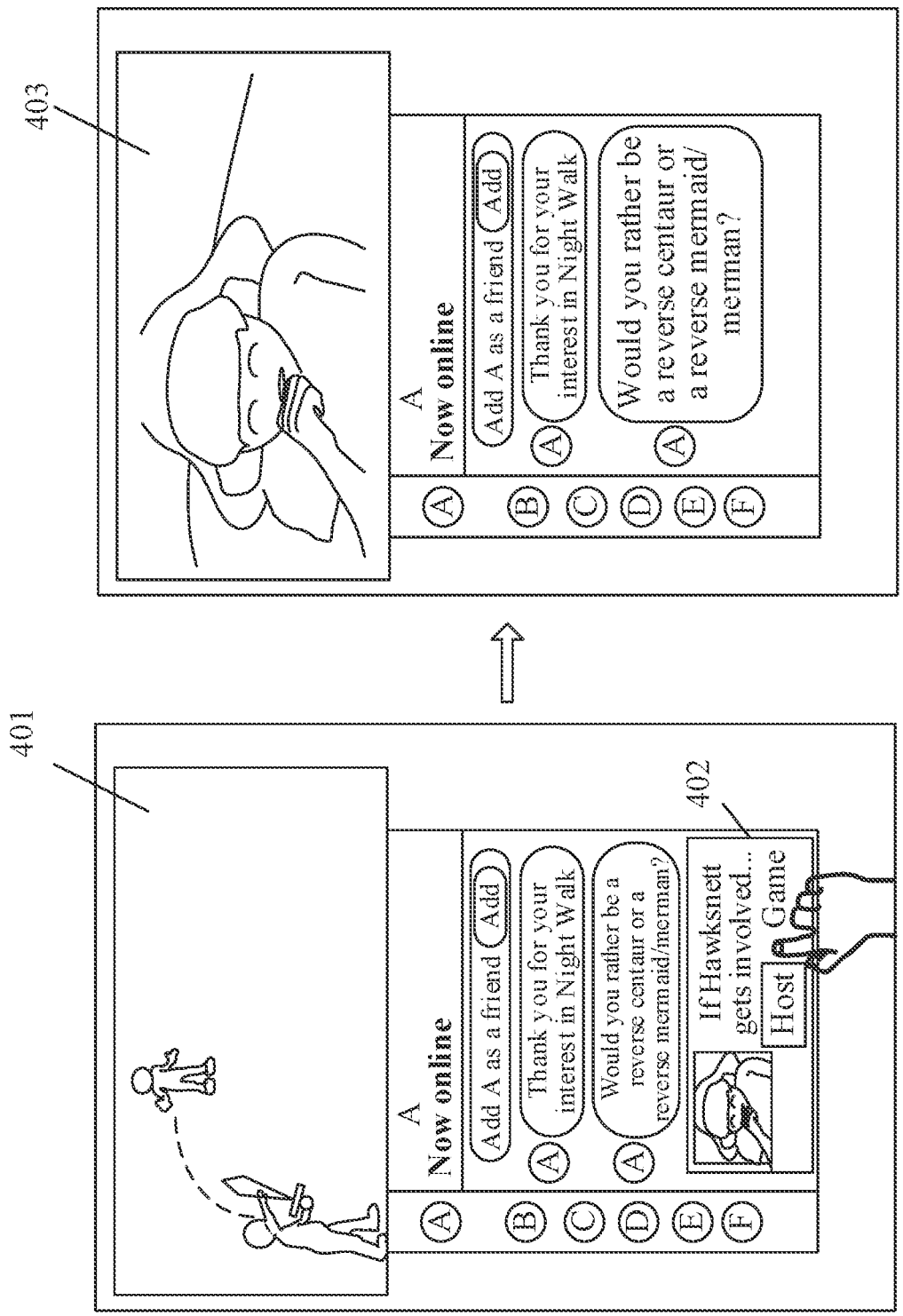
FIG. 4 is a second schematic diagram of an image of a target application according to an embodiment of this application.

As one implementation, if the second account is currently in the hosting status, the second link to what is currently hosted by the second account is displayed in the chat information display region for the first account and the second account. As shown in FIG. 4, which is a second schematic diagram of the image of the target application according to an embodiment of this application, the live stream image 401 that the account is currently watching is displayed in the target application, the second link 402 is displayed in the chat information display region, and the second link also displays that what is linked by the second link is a host, denoted by Host. The second link may further include a thumbnail of what is hosted by the second account, a hosting title and a game category, etc. Automatic jumping to the hosted image 403 is achieved by clicking the second link, and the second link disappears after the host is offline. The user logging in to the live stream application client with the first account performs an operation on the second link, for example, a touch operation and a click operation. In response to the operation, the hosted image corresponding to the second link is displayed in the live stream application client. In this embodiment, by displaying the link to what is currently hosted by the second account in the chat information display region, the accounts may share hosted contents conveniently, and the user experience is enhanced.

Figure 5:
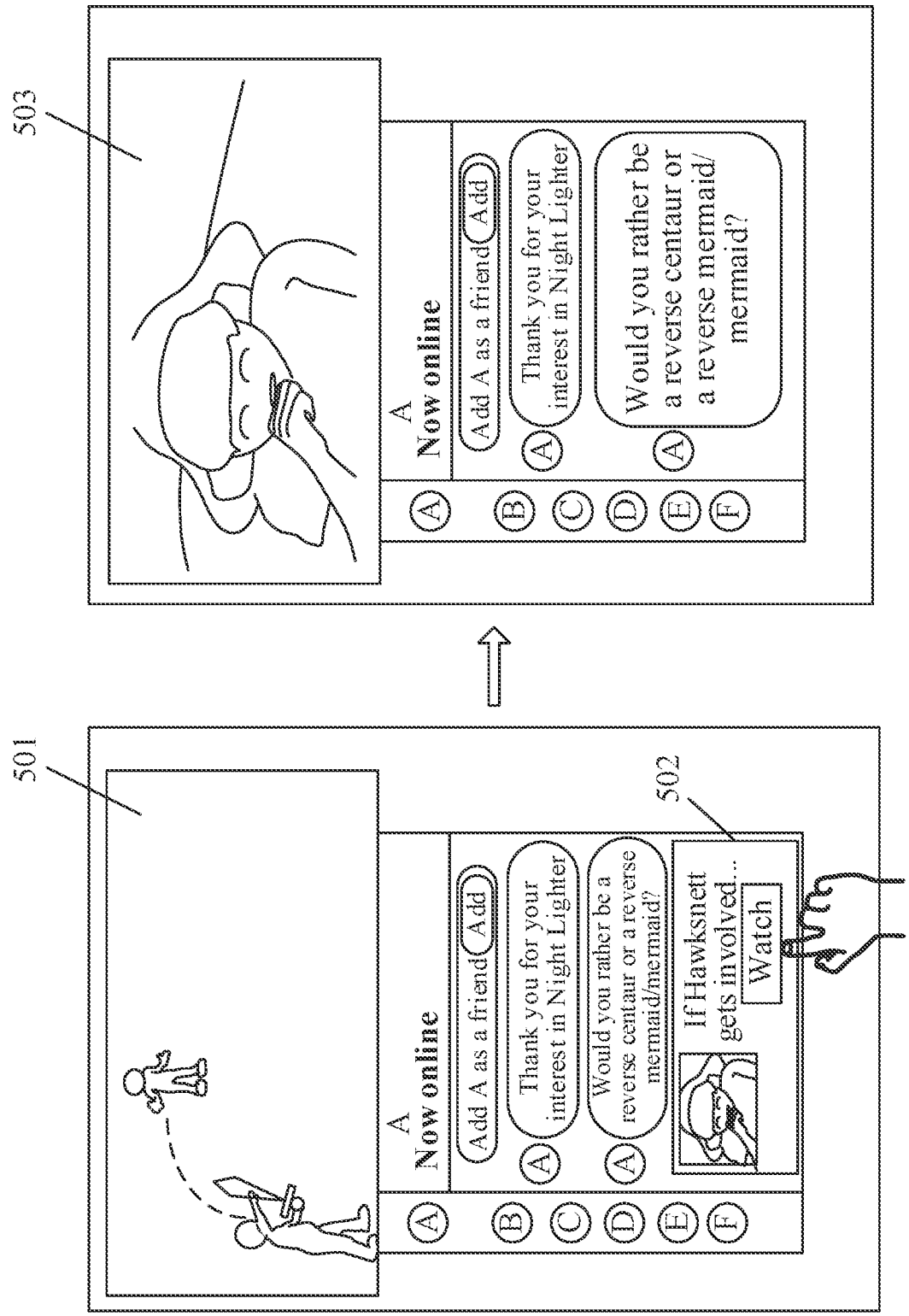
FIG. 5 is a third schematic diagram of an image of a target application according to an embodiment of this application.

As one implementation, if the second account is currently in the status of watching a live stream, the third link to a live room that the second account is currently watching is displayed in the chat information display region for the first account and the second account. As shown in FIG. 5, which is a third schematic diagram of the image of the target application according to an embodiment of this application, the live stream image 501 that the account is currently watching is displayed in the target application, and the third link 502 is displayed in the chat information display region. A thumbnail of the live room that the second account is currently watching, a live title and game category of the second live room, etc. are also displayed on the third link. Automatic jumping to the live stream image of the second live room that the second account is currently watching is achieved by clicking the third link, and the third link disappears after a live stream of the second live room is offline. The user logging in to the live stream application client with the first account performs an operation on the third link, for example, a touch operation and a click operation. In response to the operation, the live stream image of the second live room corresponding to the third link is displayed in the live stream application client. In this embodiment, by displaying the link to the live stream that the second account is currently watching in the chat information display region, the accounts may conveniently share live streams that the accounts are watching, and the user experience is enhanced.

The method further includes the following step: display status information corresponding to the current status of the second account in the chat information display, region.

As one implementation, if the second account is now on live in the first live room, the second account being currently in the livestreaming status is displayed in the chat information display region. If the second account is hosting live stream contents of other accounts, the second account is in the hosting status, and the second account being currently in the hosting status is displayed in the chat information display region. If the second account is watching contents live streamed by other accounts in the second live room, the second account is in the status of watching the live stream in the second live room.

The displaying status information corresponding to the current status of the second account in the chat information display region of the target application includes: display, when the second account is a live stream account of the first live room and the second account is currently in the livestreaming status, first status information in the chat information display region, the status information including the first status information, the first status information being used for indicating that the second account is currently in the livestreaming status; or display, when the second account is currently in the hosting status, second status information in the chat information display region, the status information including the second status information, the second status information being used for indicating that the second account is currently in the hosting status or display, when the second account is currently watching the second live room, third status information in the chat information display region, the status information including the third status information, the third status information being used for indicating that the second account is currently watching the second live room.

As one implementation, taking the case that the second account is in the livestreaming status as an example, the first status information may be displayed at a position below a user name of the second account. The first status information is used for indicating that the second account is now on live, and contents of the first status information may be set according to actual situations, for example, "now on live", "online", and "live". As shown in FIG. 6, which is a fourth schematic diagram of the image of the target application according to an embodiment of this application, the first status information 601 is included and shows "now on live", indicating that the account A is live streaming.

As one implementation, taking the case that the second account is in the hosting status as an example, the second status information may be displayed below the user name of the second account. The second status information is used for indicating that the second account is on hosting, and the second status information may be determined according to the actual situation, for example, "On hosting" and "Now hosting". As shown in FIG. 7, which is a fifth schematic diagram of the image of the target application according to an embodiment of this application, the second status information 701 is included and shows "Now hosting", indicating that the account A is on hosting.

As one implementation, taking the case that the second account is in the status of watching a live stream as an example, the third status information may be displayed below the user name of the second account. The third status information is used for indicating that the second account is watching a live stream, and the third status information may be set according to actual situations, for example, "Watching a live stream" and "Watching . . . ". As shown in FIG. 8, which is a sixth schematic diagram of the image of the target application according to an embodiment of this application, the third status information 801 is included and shows "Watching AssassinDave", indicating that the account A is watching a live stream of a live streamer AssassinDave. The third status information may further include a special icon status of an eye pattern which may be displayed next to a profile picture of the second account, for example, the third status information 802 shown in FIG. 8. The special icon status of the eye pattern is only for the purpose of illustrating this embodiment, and specific display patterns may be determined according to the actual situation. Jumping to the live stream image of the second live room that the second account is watching may be achieved by clicking the eye pattern shown by 802.

In the above-mentioned embodiment, by displaying the current status of an account in the chat information display region, the first account may conveniently know the status of the second account currently chatting therewith, the first account and the second account may share the live stream image conveniently, and the user experience is enhanced.

The method further includes the following steps: display the target chat panel in the target application, display a first account set in the account display region on the target chat panel, and display the chat information between the first account and the second account in the chat information display region on the target chat panel, accounts in the first account set being accounts chatting with the first account, the first account set including the second account, the second account being identified as an account currently chatting with the first account in the account display region; acquire a fourth operation instruction executed on a third account in the first account set, the fourth operation instruction being used for selecting the third account; and identify, in response to the fourth operation instruction, the third account as an account currently chatting with the first account in the account display region of the target chat panel, and display chat information between the first account and the third account in the chat information display region.

As one implementation, taking the target application being a live stream client as an example, the first account logs in to the live stream client. As shown in FIG. 9, which is a seventh schematic diagram of the image of the target application according to an embodiment of this application, the target chat panel is included, and the target chat panel includes the account display region 902 and the chat information display region 903, where accounts A, B and C chatting with the first account are displayed in the account display region. Taking the second account being the account A and the third account being the account C as an example, as shown in the figure, the account A is an account currently chatting with the first account, and the account A is displayed in the account display region as the account currently chatting with the first account. The chat information ("Hi", "Hey") between the first account and the account A is displayed in the chat information display region of the target chat panel. Other accounts chatting with the first account are also displayed in the account display region 902. A user may select the account C in the account display region. The fourth operation instruction may be an instruction of performing operations such as clicking and touch control on the account C. In response to the fourth operation instruction, the live stream client displays the account C in the account display region as the current currently chatting with the first account, and the chat information ("That is so impressive", "the GOAT") between the first account and the account C is displayed in the chat information display region. In this embodiment, the chat information between the first account and other accounts may be switched to be displayed in the chat information display region, so that the chat information between the first account and a plurality of accounts may be respectively displayed in the chat information display region of the live stream client. Since the chat information between the first account and the plurality of accounts may be respectively displayed by one chat information display region, the problem that the plurality of chat windows cover a live stream image, which affects the user to watch a live stream in the related art is avoided, and the experience of the user watching the live stream is enhanced.

The method further includes the following steps: display a target message panel in the target application, a target chat list being displayed in the target message panel, each chat record in the target chat list including an account chatting with the first account and part of chat information between the first account and the account; and acquire a fifth operation instruction executed on a first chat record in the target message panel, the first chat record being a chat record between the first account and the second account, the fifth operation instruction being used for instructing to expand and display the chat information between the first account and the second account. The displaying a first account set in the account display region on the target chat panel, and displaying the chat information between the first account and the second account in the chat information display region on the target chat panel includes: display, in response to the fifth operation instruction, the first account set in the account display region, identify the second account as the account currently chatting with the first account in the account display region, and display the chat information between the first account and the second account in the chat information display region.

Figure 10:
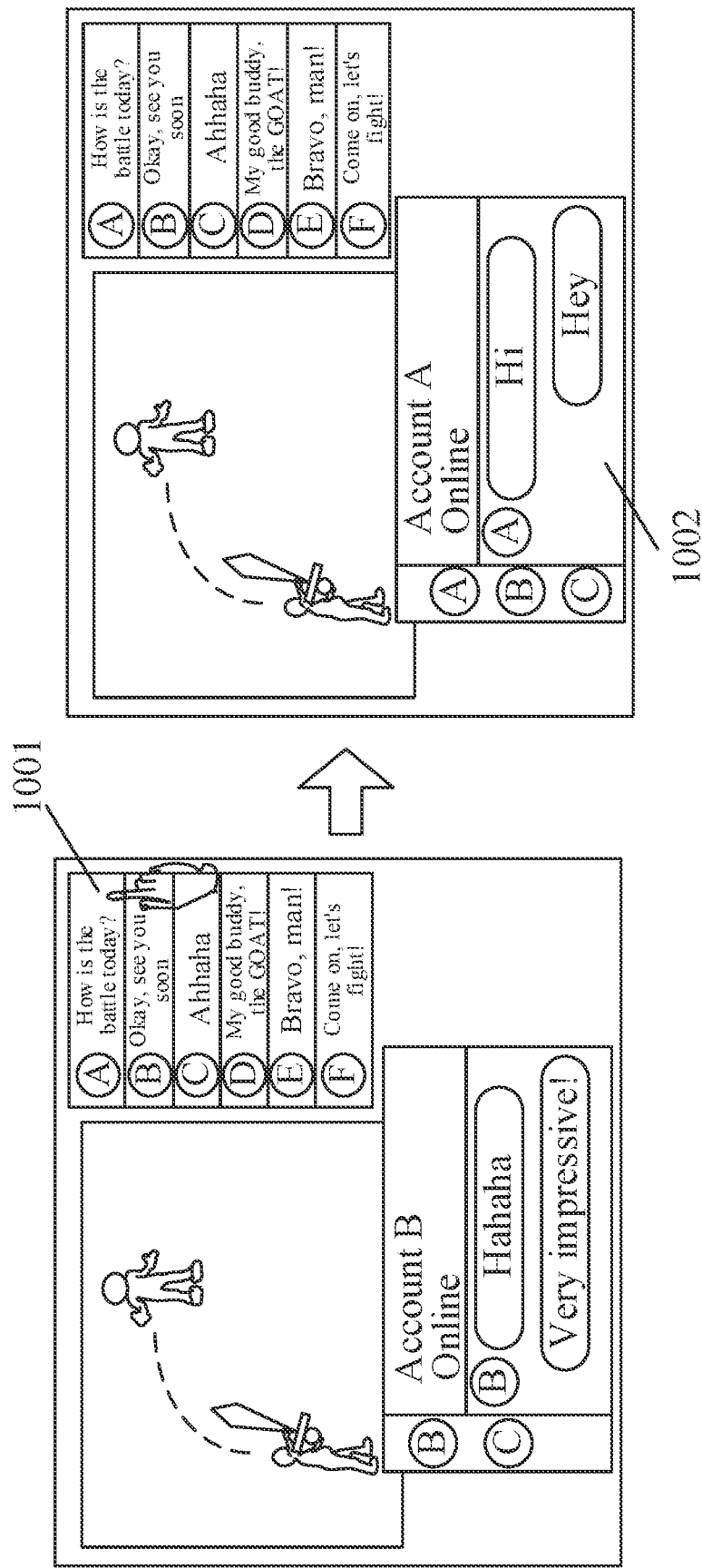
FIG. 10 is an eighth schematic diagram of an image of a target application according to an embodiment of this application.

As one implementation, taking the target application being the live stream client as an example, the first account logs in to the live stream client. As shown in FIG. 10, which is an eighth schematic diagram of the image of the target application according to an embodiment of this application, the target message panel 1001 is included, the target chat list is displayed in the target message panel, and the target chat list includes accounts A, B, C, D, E and F chatting with the first account, and part of chat information between the first account and the accounts A, B, C, D, E and F. The accounts A, B, C, D, E and F may be accounts which have chatted with the first account in the past time, and may include friends of the first account, strangers and other persons. The part of chat information may be historical chat records between the first account and the accounts A, B, C, D, E and F in the past time. For example, part of chat information between the first account and the account A is "How is the battle today?", and part of chat information between the first account and the account B is "Okay, see you soon". Taking the first chat record being a chat record between the first account and the account A as an example, the user may click or touch the chat record between the first account and the account A, for example, as shown in the figure, the user may click the part of chat information ("How is the battle today?") between the first account and the account A to generate the fifth operation instruction, the fifth operation instruction being used for instructing to expand the chat information between the first account and the account A. In response to the fifth operation instruction, the live stream client displays the first account set (the first account set includes the account A) in the account display region shown in the figure, displays the account A in the account display region as the account currently chatting with the first account, and displays the chat information ("Hi", "Hey") between the first account and the account A in the chat information display region 1002. In this embodiment, an account may be selected from the target chat list, the selected account is displayed in the account display region of the target chat panel, and the chat information between the first account and the selected account is displayed in the chat information display region of the target chat panel. The chart information between the plurality of accounts in the account display region and the first account may be switched to be displayed by the target chat panel, avoiding the problem that the live stream image is covered with the plurality of chat windows in the related art.

The displaying the target chat panel in the target application includes: display a live stream image of a third live room and the target chat panel in a target live stream application, the third live room being a live room that the first account is currently watching, the target application including the target live stream application; or, display a playout image of a first video and the target chat panel in a target video application, the target application including the target video application.

As one implementation, the target application may be the live stream application client or the video application client. In this embodiment, taking the live stream application client as an example, in the case that the first account is currently watching the live stream image of the third live room, the live stream image of the third live room and the target chat panel are displayed in the live stream application client. The target chat panel includes a plurality of accounts chatting with the first account and part of chat records between the first account and each account of the plurality of accounts. In this embodiment, the first account may chat with other accounts in the live stream client, and the experience of the user watching the live stream is enhanced.

As one implementation, taking the target application being the video client as an example, the video client may be a client for playing videos, and the videos that may be played in the video client include, but are not limited to, movies, television series, variety shows, short videos, etc. The first video may be a movie, a television show, a variety show, a short video, etc. Taking the first video being a movie as an example, a playout image of the movie and the target chat panel are displayed in the video client. The target chat panel includes a plurality of accounts chatting with the first account and part of chat records between the first account and each account of the plurality of accounts. In this embodiment, the user may chat with other accounts in the video client, and the experience of the user watching the video is enhanced.

The method further includes the following steps: display a target time-sync comment panel in the target application, the target time-sync comment panel displaying time-sync comment information transmitted by accounts watching the third live room; and acquire a sixth operation instruction executed on first time-sync comment information in the target time-sync comment panel, the first time-sync comment information being time-sync comment information transmitted by the second account, the sixth operation instruction being used for instructing to expand and display the chat information between the first account and the second account. The displaying a first account set in the account display region on the target chat panel, and displaying the chat information between the first account and the second account in the chat information display region on the target chat panel includes: display, in response to the sixth operation instruction, the first account set in the account display region, identify the second account as the account currently chatting with the first account in the account display region, and display the chat information between the first account and the second account in the chat information display region.

Figure 11:
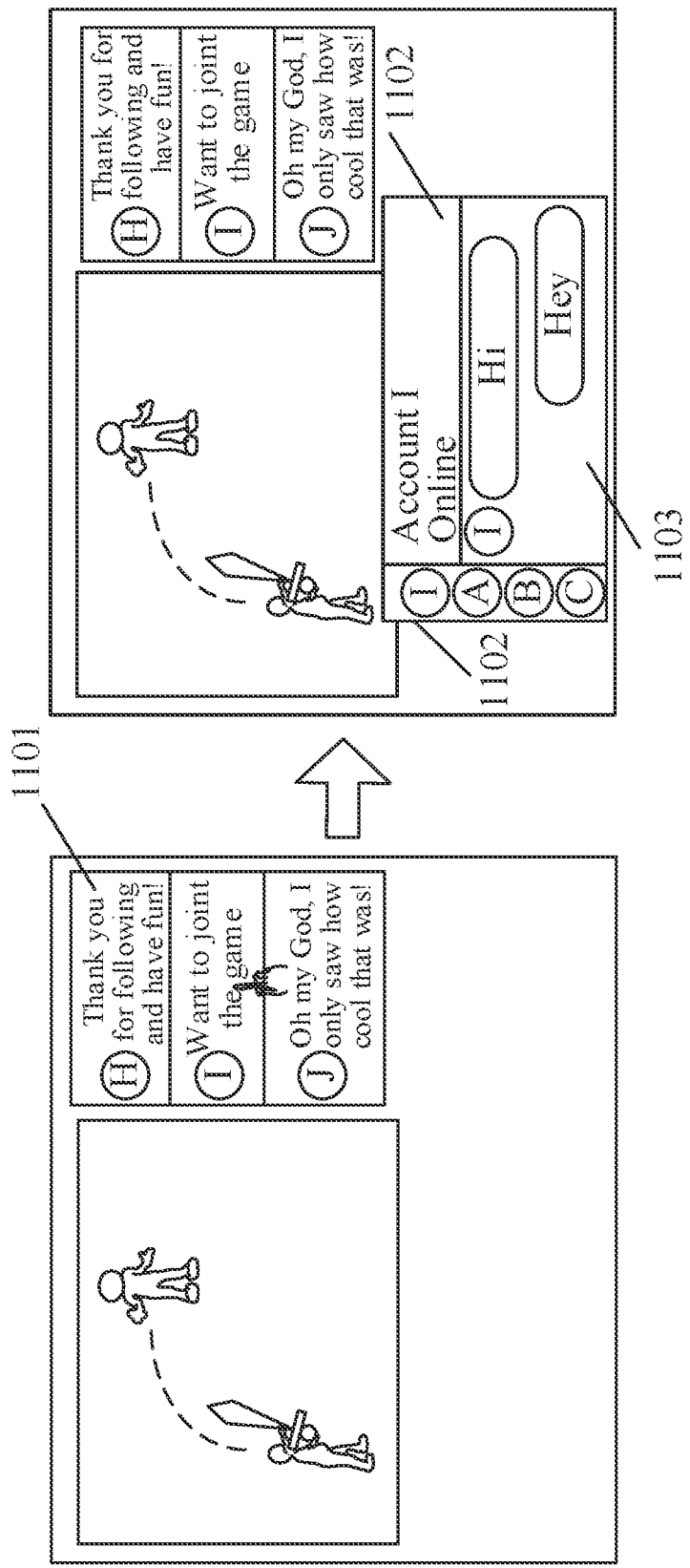
FIG. 11 is a ninth schematic diagram of an image of a target application according to an embodiment of this application.

As one implementation, taking the target application being the live stream application client as an example, the target time-sync comment panel may be used for displaying time-sync comment information transmitted by a user watching the third live room, and the user watching the third live room logs in to the live stream application client with a watching account. As shown in FIG. 11, which is a ninth schematic diagram of the image of the target application according to an embodiment of this application, the target time-sync comment panel 1101 is included, where time-sync comment information transmitted by accounts such as H, I, and J watching the third live room is displayed on the target time-sync comment panel, for example, "Thank you for following and have fun" transmitted by the account H is displayed on the target time-sync comment panel. A player may select an account desired to chat with from a plurality of accounts displayed in the target time-sync comment panel, specifically, by clicking time-sync comment information transmitted by the account. Taking the second account being the account I in the figure as an example, the user may select the account I by clicking on time-sync comment information transmitted by the account I. For example, the user clicks on a time-sync comment "Want to join the game" transmitted by the account I to generate the sixth operation instruction. In response to the sixth operation instruction, the live stream client displays the first account set chatting with the first account in the account display region 1102, the first account set including the account I. The account I is displayed in the account display region 1102 as the account currently chatting with the first account, and the chat information ("Hi", "Hey") between the first account and the account I is displayed in the chat information display region 1103.

Figure 12:
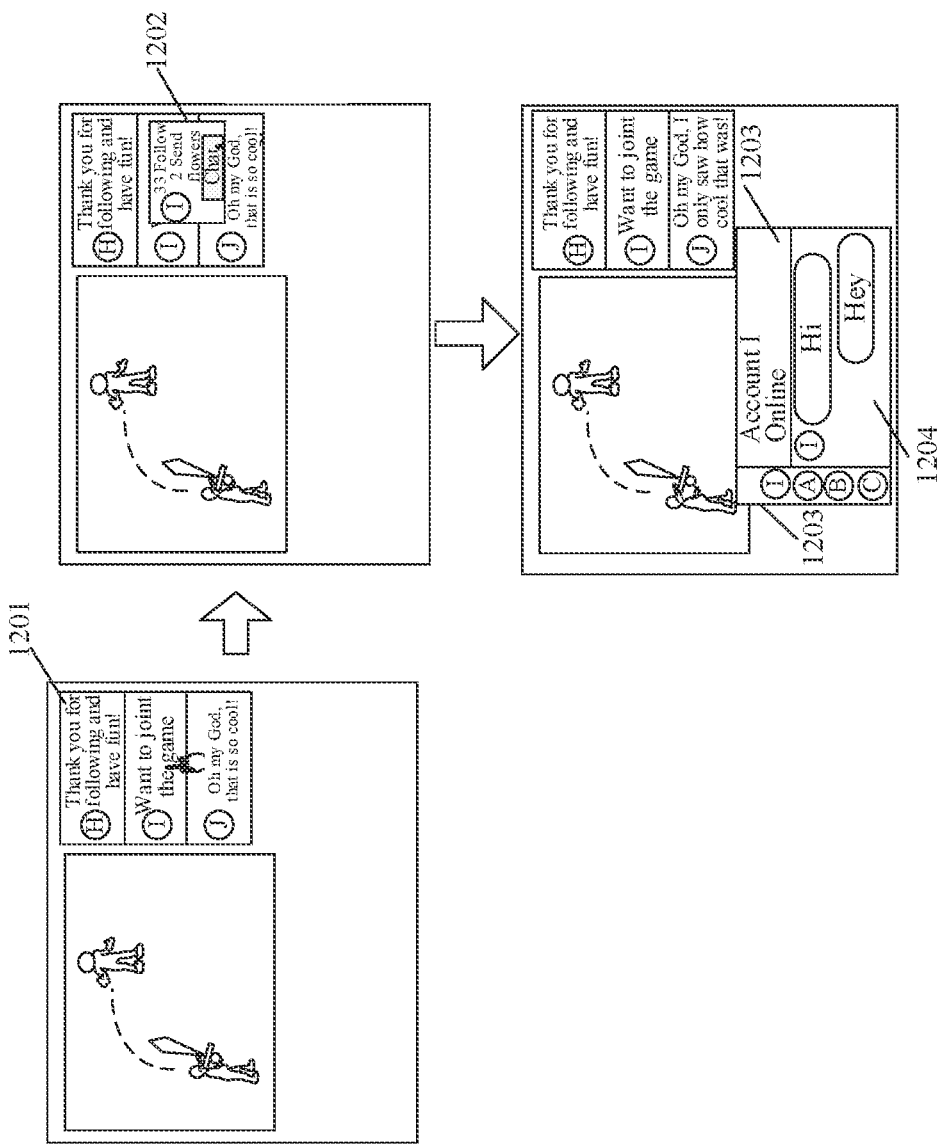
FIG. 12 is a tenth schematic diagram of an image of a target application according to an embodiment of this application.

As one implementation, each account making comments on the target time-sync comment panel has a unique user identification (UID), and after clicking on a time-sync comment to expand a user panel and continuing to click on a "message" button, a "C2C conversation" event is triggered and carries the UID as a parameter. After receiving the "C2C conversation" event, the target application may change the target chat panel from hidden to shown, then create a conversation with the UID as a parameter through an interface getConversationProfile of IM SDK, and then pull a message list through getConversationMessageList for showing. As shown in FIG. 12, which is a tenth schematic diagram of the image of the target application according to an embodiment of this application, the target time-sync comment panel 1201 is included, where the time-sync comment information transmitted by the accounts such as H, I, and J watching the first live room is displayed on the target time-sync comment panel, for example, "Thank you for following and have fun" transmitted by the account H is displayed on the target time-sync comment panel. The player may select an account desired to chat with from the plurality of accounts displayed in the target time-sync comment panel, specifically, by clicking the time-sync comment information transmitted by the account. Taking the second account being the account I in the figure as an example, the user may select the account I by clicking on time-sync comment information transmitted by the account I. For example, if the user clicks on the time-sync comment "Want to join the game" transmitted by the account I, a user panel 1202 is displayed in the live stream client, and the user panel is used for prompting to create a chat with the account I. When the user clicks on a "chat" button, the first account set chatting with the first account is displayed in the account display region 1203, the first account set including the account I. In addition, the account I is displayed in the account display region 1203 as the account currently chatting with the first account, and the chat information ("Hi", "Hey") between the first account and the account I is displayed in the chat information display region 1204.

In the above embodiment, the second account desired to chat with may be selected in the target time-sync comment panel, the second account is added to the target chat panel, the second account chatting with the first account is displayed in the account display region of the target chat panel, and the chat record between the first account and the second account is displayed in the chat information display region. The operation flow of a user chat is simplified, the chat efficiency is improved, and the user experience is enhanced.

The method further includes the following steps: acquire a seventh operation instruction executed on the target chat panel, the seventh operation instruction being used for instructing to switch a status of the target chat panel into a collapsed status; and switch, in response to the seventh operation instruction, the target chat panel to a first chat panel in the target application, and display, in the first chat panel, a fourth account in the first account set, the first chat panel being the target chat panel in the collapsed status, displaying of the account display region and the chat information display region in the first chat panel being canceled.

Figure 13:
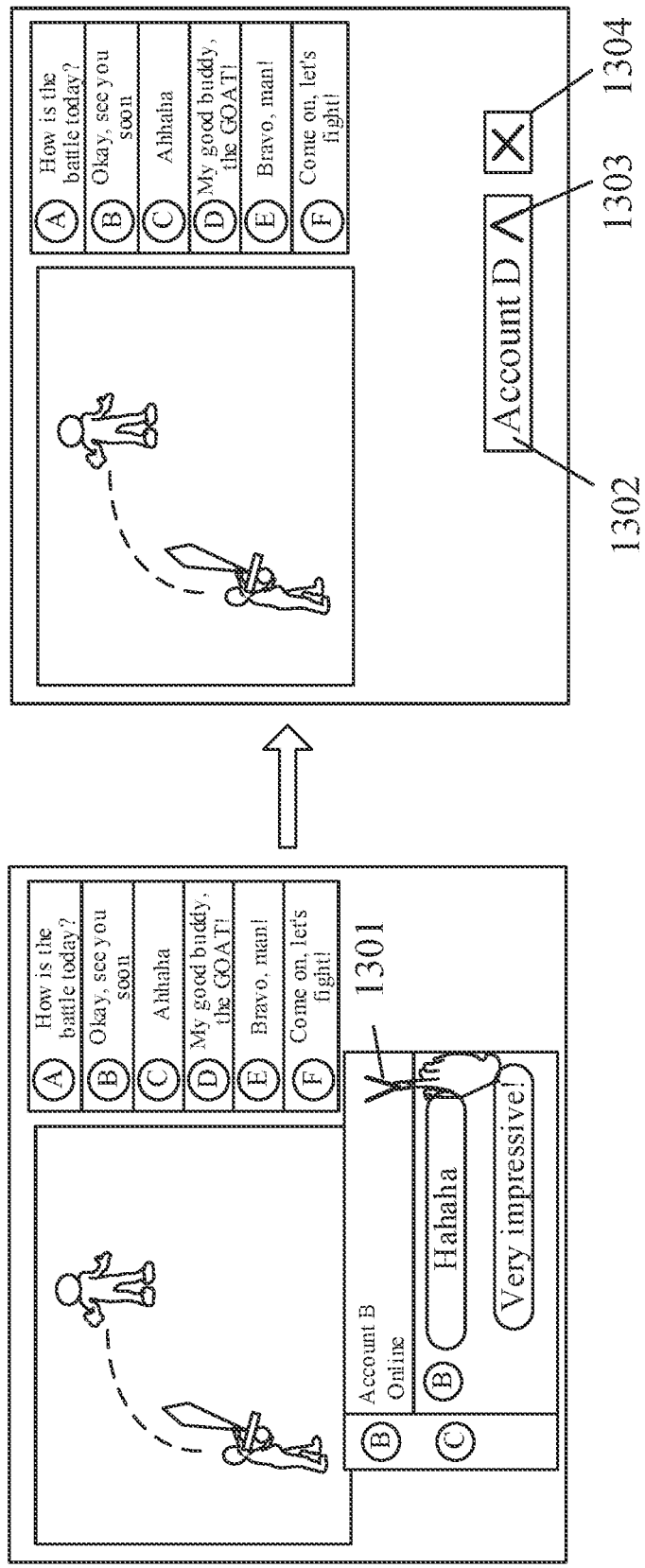
FIG. 13 is an eleventh schematic diagram of an image of a target application according to an embodiment of this application.

As one implementation, as shown in FIG. 13, which is an eleventh schematic diagram of the image of the target application according to an embodiment of this application, the target chat panel includes a zoom-out control 1301, and the user may switch the target chat panel to the collapsed status by touching the control. The first chat panel in the collapsed status is shown in 1302. A user name of an account D chatting with the first account is displayed on the first chat panel in the collapsed status. A zoom-in control 1303 is also displayed on the first chat panel in the collapsed status, and the user may switch the first chat panel to the target chat panel in an expanded status by touching the zoom-in control. A close control 1304 is also displayed on the first chat panel in the collapsed status, and the user may close the first chat panel by clicking the close control. The first chat panel is a zoomed-out status of the target chat panel and compared with the target chat panel, the first chat panel does not have the account display region or the chat information display region. In this embodiment, by switching the target chat panel to the first chat panel in the collapsed status, the display area of the chat panel in the live stream image is reduced, and the user experience is enhanced.

The method further includes the following step: switch, when the first chat panel is displayed in the target application and a fifth account in the first account set transmits chat information to the first account, an account displayed in the first chat panel from the fourth account to the fifth account.

Figure 14:
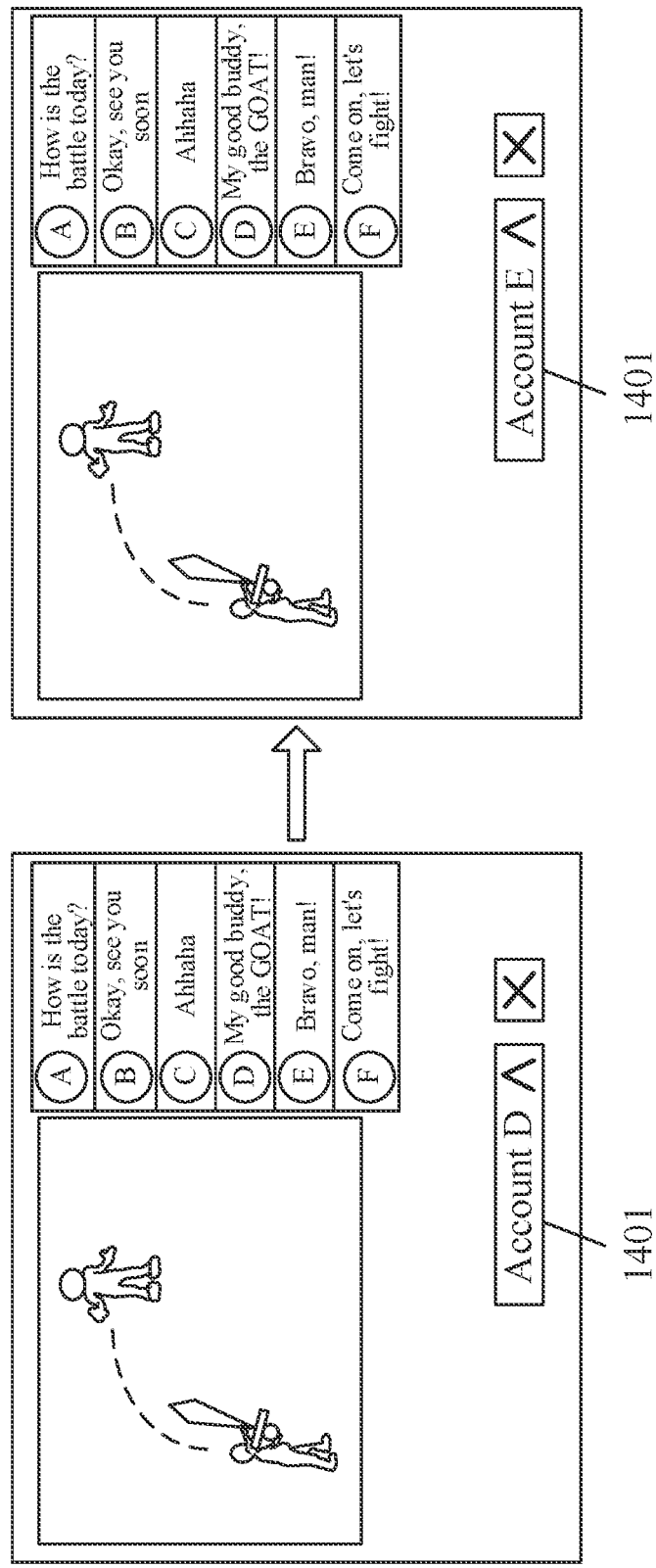
FIG. 14 is a twelfth schematic diagram of an image of a target application according to an embodiment of this application.

As one implementation, the account displayed by the first chat panel in the collapsed status may be an account that most recently transmits chat information to the first account. As shown in FIG. 14, which is a twelfth schematic diagram of the image of the target application according to an embodiment of this application, the account D is displayed on the first chat panel 1401, and if the account E transmits chat information to the first account, the account D displayed on the first chat panel is switched to the account E. In this embodiment, by displaying the account which most recently transmits the chat information to the first account in the first chat panel in the collapsed status, the user may be reminded of the latest received chat information in time, which improves the chat efficiency.

The displaying, in the first chat panel, a fourth account in the first account set includes: display, when the third account is identified as the account currently chatting with the first account, the third account in the first chat panel, the fourth account being the third account; or display, when the third account is identified as the account currently chatting with the first account and the fourth account is the latest account in the first account set to transmit chat information to the first account, the fourth account in the first chat panel.

As one implementation, the account name displayed in the first chat panel in the collapsed status may be the name of the account currently chatting with the first account or the account that most recently transmits chat information to the first account. Assuming that the account A is currently chatting with the first account, the account A is displayed in the first chat panel in the collapsed status. If the latest chat information received by the first account most recently is chat information transmitted by the account C, the account C is displayed in the first chat panel. In this embodiment, by displaying the account currently chatting with the first account or displaying the account transmitting the latest chat information to the first account in the first chat panel in the collapsed status, the first account may check the latest received chat information in time, which improves the chat efficiency of the first account.

Figure 15:
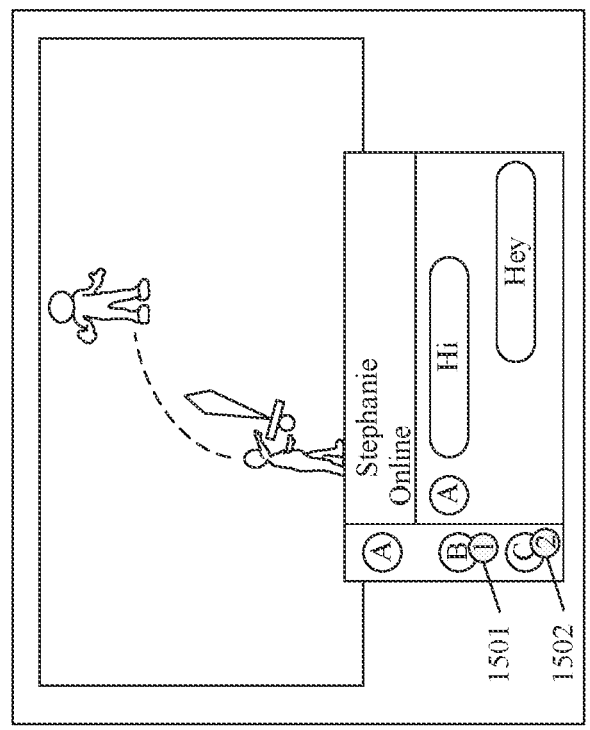
FIG. 15 is a thirteenth schematic diagram of an image of a target application according to an embodiment of this application.

As one implementation, when the first account receives a new message, the account display region may transmit an account profile picture of the message to the top, and display an identifier with a number as a reminder. As shown in FIG. 15, which is a thirteenth schematic diagram of the image of the target application according to an embodiment of this application, an identifier 1501 and an identifier 1502 are shown in the figure, where the identifier 1501 indicates that the account B transmits a new message to the first account and the first account has not checked the new message, and the identifier 1502 indicates that the account C transmits two new messages to the first account and the first account has not checked the two new messages. In this embodiment, by reminding the first account that the latest received message has not been checked through the identifiers, the omission of checking the new message by the first account is avoided, and the checking accuracy of chat information is improved.

Figure 16:
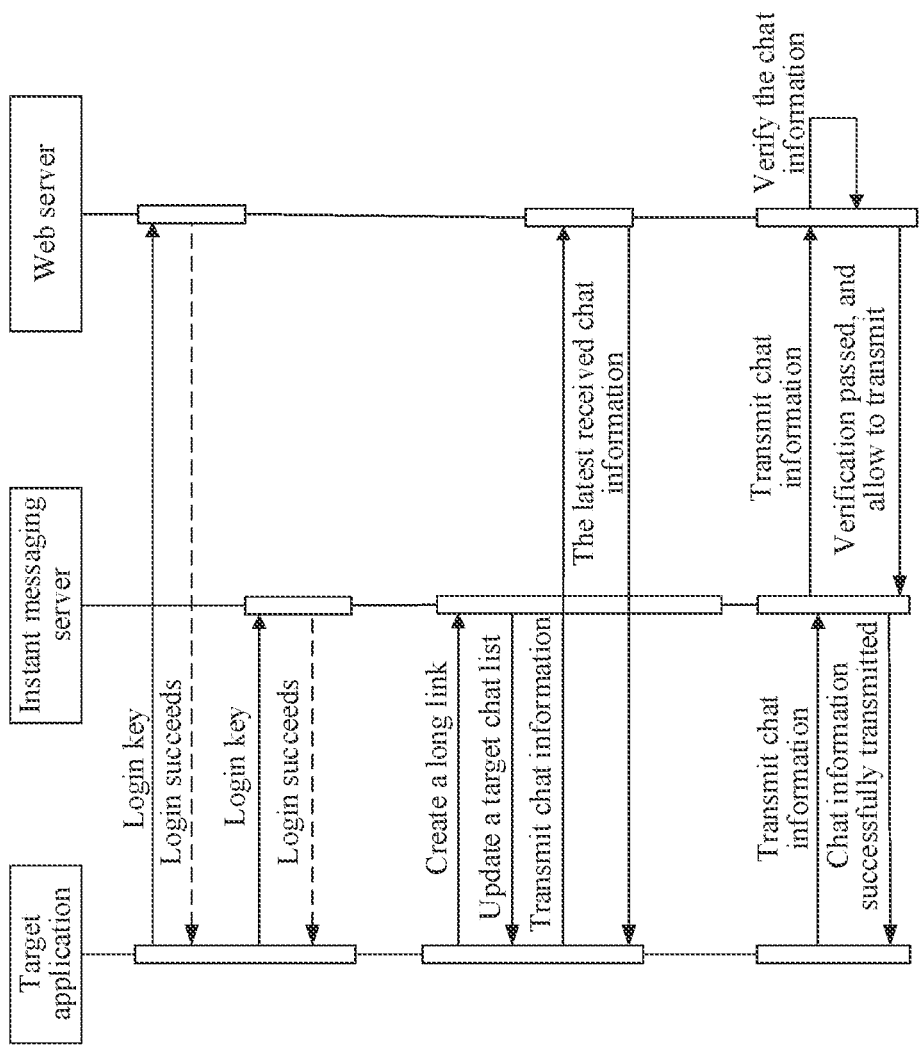
FIG. 16 is a schematic diagram of information interaction according to an embodiment of this application.

As one implementation, by additionally setting the chatting function in the live stream client or the video client, and applying instant messaging to the live stream client or the video client, the experience of the user watching the live stream or video may be enhanced. As shown in FIG. 16, which is a schematic diagram of information interaction according to this application, the target application is included, where the target application is installed on the terminal device and may be a live stream application or a video application. An instant messaging server and a website server are also included in the figure. Information interaction shown in the figure includes:

Step S1602. Log in to the target application by the user with the first account, and transmit, by the target application, a login key to a website server. The login key includes, but is not limited to, an account, a password, etc. The account may be a mobile phone number, an email address, a user name, etc. The password is a password set by the user when registering the first account. When the login key passes verification of the network, a message indicating successful login is returned to the target application.

Step S1604. Transmit, by the target application, a login key to the instant messaging server. The login key includes, but is not limited to, an account, a password, etc. The account may be a mobile phone number, an email address, a user name, etc. The password is a password set by the user when registering the first account. When the login key passes verification of the instant messaging server, a message indicating successful login is returned to the target application.

Step S1606. Create a long connection between the target application and the instant messaging server to receive a message prompt and a forwarded new message in real time. The instant messaging server updates the target chat list of the target message panel in the target application, and the target chat list includes accounts chatting with the first account and part of chat information.

Step S1608. Transmit, by the first account, the chat information to the website server via the target application, and transmit, by the website server, the latest received chat information to the target application.

Step S1610. Update, by the target application, the account display region, the quantity of received messages, and an identifier of receiving the latest message.

Step S1612. Upon receiving a new message transmitted by the instant messaging server, update, by the target application, the account display region, the quantity of received messages, and an identifier of receiving the latest message.

Step S1614. Transmit, by the first account, the chat information to the instant messaging server via the target application; forward, by the instant messaging server, the chat information to the website server; verify, by the website server, whether the chat information may be transmitted; when the chat information passes the verification, transmit, to the instant messaging server, a notification that the chat information may be transmitted; and return, by the instant messaging server to the target application, a notification that the chat information is successfully transmitted.

With the above-mentioned embodiment, chat interaction between accounts watching a live stream or video in the target application is more facilitated. The user may be notified in time in the form of an identifier or a system message when a new message is received. In addition, the chat message of the user may be stored longer. Moreover, a live stream prompt message is displayed on a chat image by clicking the status information of the account, so that the user may know general contents of the live stream made by or watched by a friend in advance, and may decide whether to jump to the live room, and the user may more conveniently select a live room that the user desires to watch.

Figure 17:
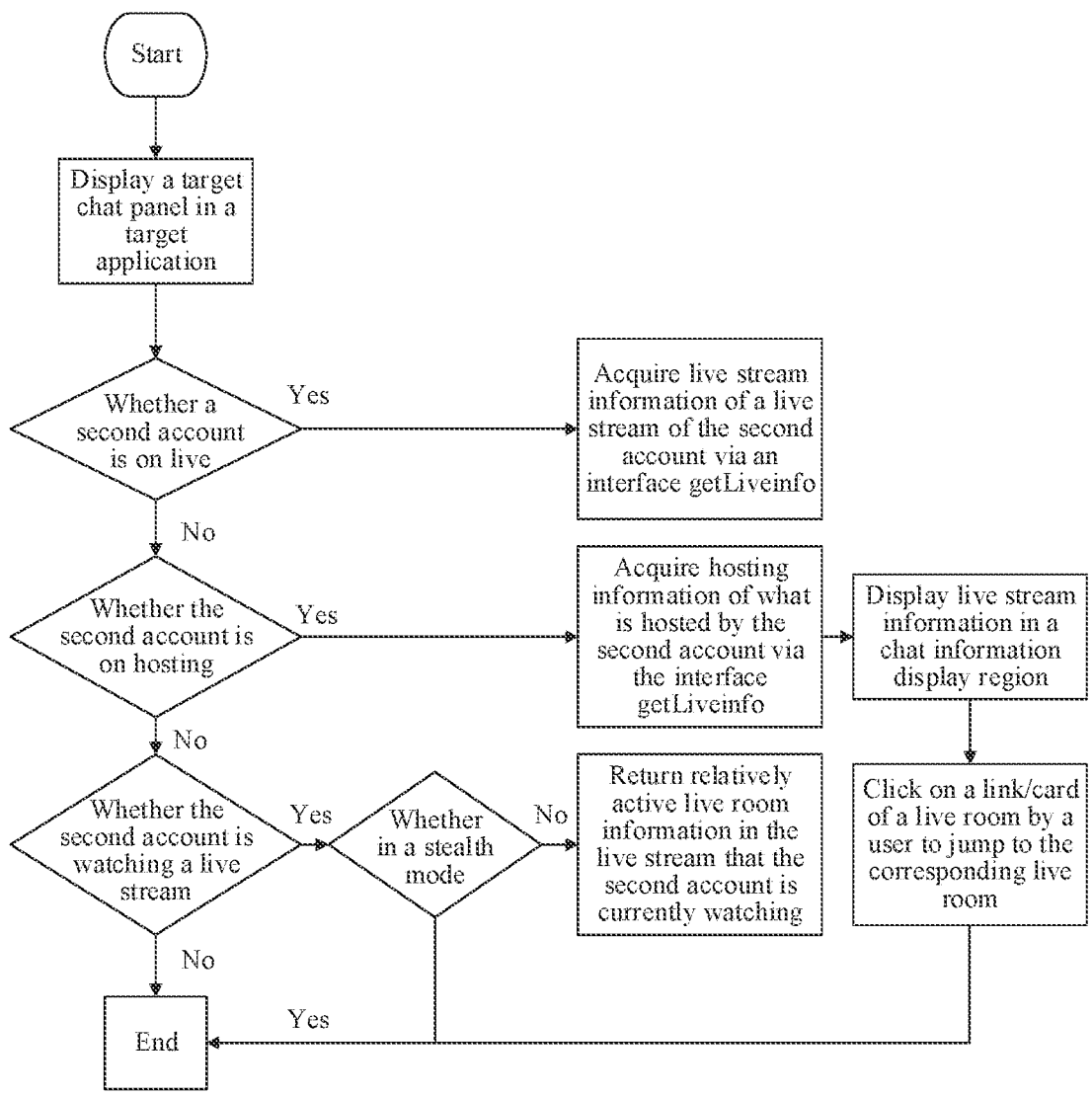
FIG. 17 is a status flowchart according to an embodiment of this application.

As one implementation, a conversation list may be pulled through IM SDK, and information of each conversation includes, but not limited to: a conversation identifier, a user identification, a user profile picture, a user name, the quantity of unread messages, etc. The IM SDK may include chat information contents, not live stream related contents. However, because the same account system is used, the current status of the user may be queried from the background based on the UID. Based on the UID in a conversation, getUserStatusInfoList is transmitted to a rear-end to query the status. Upon the query, additional information of the current user includes: a livestreaming status, a hosting status, and a watching status, and the current status of the user is displayed according to user information. FIG. 17 is a status flowchart according to an embodiment of this application, including:

Step S1702. Display the target chat panel in the target application, the chat information between the first account and the second account being displayed in the chat information display region of the target chat panel.

Step S1704. Determine whether the second account is on live, or on hosting, or watching a live stream.

Step S1706. If the second account is on live, acquire live stream information of the live stream of the second account via the interface getLiveinfo, and display the live stream information of the second account, including but not limited to a link to the live stream of the second account, in the chat information display region.

Step S1708. If the second account is on hosting, acquire hosting information of the second account via the interface getLiveinfo, and display the hosting information of the second account, including but not limited to a hosting link, in the chat information display region.

Step S1710. If the second account is watching a live stream, determine whether the second account is in a stealth mode, return, if the second account is not in the stealth mode, relatively active live room information in the live stream that the second account is currently watching, and display the active live room information, including but not limited to a link to a live room, in the chat information display region.

Step S1712. Acquire, by the target application, a link or card for clicking a live stream, enter a live room corresponding to the link or card, and display the live stream image in the target application.

In the above embodiment, the structure of a private chat message between accounts is based on a default structure of IM SDK, which is mainly text. Emoji may be implemented through text escape. The emoji transmitted by users is actually text starting with a colon (:)+words. When rendering on the client side, the emoji is firstly split by regular expressions to acquire an emoji name, and then a configured emoji image corresponding to the emoji name is acquired, achieving correct displaying. The friend request may be implemented through a custom message, and the structure thereof is a JSON string. When a user initiates a friend request, the friend request is issued through a service end. The content is a JSON string as "{" "FRIEND_REQUEST", "content": Hi, Lets be friend. "}" to be distinguished from the plain text message.

In the above-mentioned embodiment, the user may not only chat with existing friends while watching videos, but also initiate a one-on-one chat with users in a time-sync comment region to avoid interference from contents in the time-sync comment region.

While the foregoing method embodiments have been presented in terms of a series of acts for purposes of simplicity of description, a person skilled in the art will appreciate that this application is not limited by the order of actions described, as some steps may occur in other orders or concurrently with other steps from this application. Secondly, a person skilled in the art will also appreciate that the actions and modules involved in the embodiments described in the specification are not necessarily required by this application.

Figure 18:
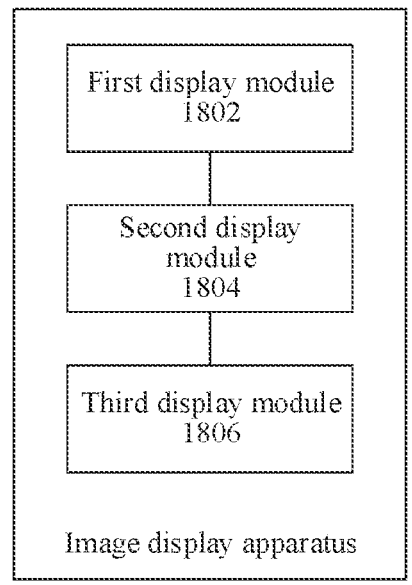
FIG. 18 is a schematic structural diagram of an image display apparatus according to an embodiment of this application.

According to another aspect of an embodiment of this application, an image display apparatus for implementing the above-mentioned image display method is further provided. As shown in FIG. 18, the apparatus includes: a first display module 1802, configured to display chat information between a first account and a second account in a chat information display region of a target application, the first account logging into the target application; a second display module 1804, configured to display an icon corresponding to a current status of the second account in the chat information display region; and a third display module 1806, configured to display, in response to an operation instruction executed on the icon, an image corresponding to the icon in the target application.

The apparatus is further configured to display, when the second account is a live stream account of a first live room and the second account is currently in a livestreaming status, a first link to the first live room in the chat information display region; display, when the second account is currently in a hosting status, a second link to an image hosted by the second account in the chat information display region; and display, when the second account is currently watching a second live room, a third link to the second live room in the chat information display region.

The apparatus is further configured to display, in response to a first operation instruction executed on the first link, a live stream image of the first live room in the target application; display, in response to a second operation instruction executed on the second link, the image hosted by the second account in the target application; and display, in response to a third operation instruction executed on the third link, a live stream image of the second live room in the target application.

The apparatus is further configured to display status information corresponding to the current status of the second account in the chat information display region.

The apparatus is further configured to display, when the second account is the live stream account of the first live room and the second account is currently in the livestreaming status, first status information in the chat information display region, the status information including the first status information, the first status information being used for indicating that the second account is currently in the livestreaming status; display, when the second account is currently in the hosting status, second status information in the chat information display region, the status information including the second status information, the second status information being used for indicating that the second account is currently in the hosting status; and display, when the second account is currently watching the second live room, third status information in the chat information display region, the status information including the third status information, the third status information being used for indicating that the second account is currently watching the second live room.

The apparatus is further configured to display a target chat panel in the target application, display a first account set in an account display region on the target chat panel, and display the chat information between the first account and the second account in the chat information display region on the target chat panel, accounts in the first account set being accounts chatting with the first account, the first account set including the second account, the second account being identified as an account currently chatting with the first account in the account display region; acquire a fourth operation instruction executed on a third account in the first account set, the fourth operation instruction being used for selecting the third account; and identify, in response to the fourth operation instruction, the third account as an account currently chatting with the first account in the account display region of the target chat panel, and display chat information between the first account and the third account in the chat information display region.

The above-mentioned apparatus is further configured to display a target message panel in the target application, a target chat list being displayed in the target message panel, each chat record in the target chat list including an account chatting with the first account and part of chat information between the first account and the account; and acquire a fifth operation instruction executed on a first chat record in the target message panel, the first chat record being a chat record between the first account and the second account, the fifth operation instruction being used for instructing to expand and display the chat information between the first account and the second account; and display, in response to the fifth operation instruction, the first account set in the account display region, identify the second account as the account currently chatting with the first account in the account display region, and display the chat information between the first account and the second account in the chat information display region.

The apparatus is further configured to display a live stream image of a third live room and the target chat panel in a target live stream application, the third live room being a live room that the first account is currently watching, the target application including the target live stream application; and display a playout image of a first video and the target chat panel in a target video application, the target application including the target video application.

The apparatus is further configured to display a target time-sync comment panel in the target application, the target time-sync comment panel displaying time-sync comment information transmitted by accounts watching the third live room; and acquire a sixth operation instruction executed on first time-sync comment information in the target time-sync comment panel, the first time-sync comment information being time-sync comment information transmitted by the second account, the sixth operation instruction being used for instructing to expand and display the chat information between the first account and the second account. The displaying a first account set in an account display region on the target chat panel, and displaying the chat information between the first account and the second account in the chat information display region on the target chat panel includes: display, in response to the sixth operation instruction, the first account set in the account display region, identify the second account as the account currently chatting with the first account in the account display region, and display the chat information between the first account and the second account in the chat information display region.

The apparatus is further configured to acquire a seventh operation instruction executed on the target chat panel, the seventh operation instruction being used for instructing to switch a status of the target chat panel into a collapsed status; and switch, in response to the seventh operation instruction, the target chat panel to a first chat panel in the target application, and display, in the first chat panel, a fourth account in the first account set, the first chat panel being the target chat panel in the collapsed status, displaying of the account display region and the chat information display region in the first chat panel being canceled.

The apparatus is further configured to switch, when the first chat panel is displayed in the target application and a fifth account in the first account set transmits chat information to the first account, an account displayed in the first chat panel from the fourth account to the fifth account.

The apparatus is further configured to display, when the third account is identified as the account currently chatting with the first account, the third account in the first chat panel, the fourth account being the third account; and display, when the third account is identified as the account currently chatting with the first account and the fourth account is the latest account in the first account set to transmit chat information to the first account, the fourth account in the first chat panel.

In the embodiments of this application, by displaying the icon corresponding to the current status of the other account (for example, the second account) during a chat in the chat information display region, the current status of the second account may be displayed by the link, for example, on live, on hosting or watching a live stream, and in response to the operation instruction executed on the icon, jumping to the image corresponding to the icon may be achieved. For example, if the second account is now on live in the first live room, the first link to the first live room is displayed in the chat information display region for the first account and the second account, and the first account may enter the first live room by clicking the first link. If the second account is now hosting, the second link to what is hosted by the second account is displayed in the chat information display region for the first account and the second account, and the first account may enter the image hosted by the second account by clicking the second link. If the second account is currently watching the second live room, the third link to the second live room is displayed in the chat information display region for the first account and the second account, and the first account may enter the second live room by clicking the third link.

By means of the embodiments of this application, the status of the other account may be checked during a chat, for example, the icon corresponding to the current status of the other account may display that the other account is now on live, or now hosting, or watching a live stream, etc. The image that the other account is watching may also be checked during the chat, for example, the live room where the other account is now on live, the live room now hosted by the other account, or the live room that the other account is watching may be respectively entered by clicking the corresponding link. The technical problem mentioned in the background art that the operation of checking the image that the other account is watching during a chat is complicated is solved, the number of operation steps is reduced, and the operation efficiency is improved.

According to yet another aspect of an embodiment of this application, an electronic device for implementing the above-mentioned image display method is further provided. The electronic device may be the terminal device or the server shown in FIG. 1. This embodiment is described by taking the electronic device being the terminal device as an example. As shown in FIG. 19, the electronic device includes a memory 1902 and a processor 1904. A computer program is stored in the memory 1902, and the processor 1904 is set to perform the steps of any one of the above-mentioned method embodiments by running the computer program.

In this embodiment, the electronic device may be located in at least one network device of a plurality of network devices of a computer network.

In this embodiment, the processor may be set to run the computer program to perform the following steps:

S1. Display chat information between a first account and a second account in a chat information display region of a target application, the first account logging into the target application.

S2. Display an icon corresponding to a current status of the second account in the chat information display region.

S3. Display, in response to an operation instruction executed on the icon, an image corresponding to the icon in the target application.

A person of ordinary skill in the art will appreciate that the structure shown in FIG. 19 is merely illustrative and that the electronic device may also be a smartphone (such as an Android cell phone and an iOS cell phone), a tablet computer, a palmtop computer, a mobile Internet device (MID), a PAD, and other terminal devices. The structure of the electronic device is not limited as FIG. 19. For example, the electronic device may also include more or fewer components (such as a network interface) than shown in FIG. 19, or have a different configuration than shown in FIG. 19.

The memory 1902 may be configured to store software programs and modules, for example, program instructions/modules corresponding to the image display method and apparatus according to the embodiments of this application. The processor 1904 runs the software programs and modules stored in the memory 1902 so as to perform various functional applications and data processing, that is, implementing the image display method. The memory 1902 may include a high speed random access memory, or a non-volatile memory such as one or more magnetic storage apparatuses, flash memories, or other non-volatile solid state memories. In some examples, the memory 1902 may further include memories remotely located with respect to the processor 1904, and the memories may be connected to the terminal via networks. Examples of such networks include, but are not limited to, the Internet, intranets, local area networks, mobile communication networks, and combinations thereof. As an example, as shown in FIG. 19, the memory 1902 may include, but is not limited to, the first display module 1802, the second display module 1804, and the third display module 1806 in the above-mentioned image display apparatus. In addition, the memory may further include, but is not limited to, other module units in the above-mentioned image display apparatus, which are not repeated in this example.

A transmission apparatus 1906 is configured to receive or transmit data via a network. Specific examples of the network may include a wired network and a wireless network. In one example, the transmission apparatus 1906 includes a network interface controller (NIC), which may be connected to a router via a network cable or other network devices so as to communicate with the Internet or the local area network. In one example, the transmission apparatus 1906 is a radio frequency (RF) module for communicating wirelessly with the Internet.

Moreover, the electronic device further includes: a display 1908, configured to display the above-mentioned chat information display region; and a connection bus 1910, configured to connect various module components in the electronic device.

In other embodiments, the terminal device or the server may be a node in a distributed system, where the distributed system may be a blockchain system, and the blockchain system may be a distributed system formed by connecting a plurality of nodes in the form of network communications.

A peer-to-peer (P2P) network may be formed by nodes, and any form of computing device, such as a server, a terminal and other electronic devices, may become a node in the blockchain system by joining the peer-to-peer network.

According to one aspect of this application, a computer program product or computer program is provided. The computer program product or computer program includes computer instructions stored in a computer-readable storage medium. A processor of a computer device reads the computer instructions from the computer-readable storage medium, and the processor executes the computer instructions to cause the computer device to perform the methods provided in the above-mentioned various implementations. The computer program is set to perform the steps in any one of the above-mentioned method embodiments when run.

In this embodiment, the computer-readable storage medium may be set to store the computer program used for performing the following steps:

S1. Display chat information between a first account and a second account in a chat information display region of a target application, the first account logging into the target application.

S2. Display an icon corresponding to a current status of the second account in the chat information display region.

S3. Display, in response to an operation instruction executed on the icon, an image corresponding to the icon in the target application.

In this embodiment, a person of ordinary skill in the art will appreciate that all or some of the steps in the methods of the above-mentioned embodiments may be completed by a program that instructs associated hardware of the terminal device. The program may be stored in a computer-readable storage medium which may include: a flash drive, a read-only memory (ROM), a random access memory (RAM), a magnetic disk, a compact disc, and the like.

The above serial numbers of the embodiments of this application are merely for the purpose of description and do not indicate the superiority or inferiority of the embodiments.

The integrated units in the above embodiments, if implemented in the form of software functional units and sold or used as stand-alone products, may be stored in the above computer-readable storage medium. Based on the understandings, the technical solutions of this application, either in essence or in part contributing to the related art, or all or part of the technical solutions, may be embodied in the form of a software product. The computer software product is stored in a storage medium, and includes a plurality of instructions to cause one or more computer devices (which may be a personal computer, a server or a network device, etc.) to perform all or part of the steps of the method according to the various embodiments of this application.

In the above embodiments of this application, the description of each embodiment has its own emphasis, and reference may be made to the related descriptions of other embodiments for the parts that are not described in detail in an embodiment.

According to the embodiments provided herein, the disclosed clients may be implemented in other ways. The apparatus embodiment described above is merely illustrative. For example, the units may be divided merely based on logical functions, and in practical implementations, there may be other division methods, for example, a plurality of units or components may be combined or integrated into another system, or some features may be omitted or not performed. In addition, the couplings or direct couplings or communication connections shown or discussed with respect to each other may be indirect couplings or communication connections via some interfaces, units, or modules, and may be electrical or otherwise.

The units described as separate components may or may not be physically separated, the components shown as units may or may not be physical units, that is, they may be located in one place or distributed over a plurality of network units. Some or all of the units may be selected to achieve the objectives of the solutions of the embodiments according to actual needs.

In addition, various functional units in various embodiments of this application may be integrated into one processing unit, or the units may be physically separate, or two or more units may be integrated into a unit. The above-mentioned integrated units may be implemented in the form of hardware or in the form of software functional units.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. While the foregoing is directed to some implementations of this application, several improvements and modifications may be made by a person of ordinary skill in the art without departing from the principle of this application, and such improvements and modifications shall also fall within the scope of protection of this application.

What is claimed is:

1. A method for displaying chat information in a target application performed by an electronic device, the method comprising:
    displaying an application image of the target application selected by a first account that logs into the target application at the electronic device;
    displaying a target time-sync comment panel and a target chat panel adjacent the application image, wherein:
        the target time-sync comment panel displays time-sync comment information transmitted by a second account watching the target application; and
        the target chat panel includes an account display region and a chat information display region, the account display region including a friend of the first account, the chat information display region including chat information between the friend and the first account; and
    in response to receiving a chat request from the first account to the second account displayed in the target time-sync comment panel, adding the second account to the account display region, and replacing the chat information between the friend and the first account with chat information between the first account and the second account in the chat information display region.

2. The method according to claim 1, further comprising:
    displaying a current status of the second account at the target application; and in response to an operation instruction executed on the current status of the second account, displaying an image corresponding to the current status in the target application, wherein the current status of the second account is displayed at the account display region of the target application.

3. The method according to claim 2, wherein the current status comprises at least one of:

the second account is livestreaming;
the second account is broadcasting; and
the second account is watching a livestream.

4. The method according to claim 2, further comprising:
displaying a link to a live room corresponding to the current status of the second account in the chat information display region.

5. The method according to claim 4, wherein the link comprises a title of the live room or a thumbnail of the live room.

6. The method according to claim 4, wherein the displaying a link to a live room corresponding to the current status of the second account in the chat information display region comprises:

displaying, when the second account is livestreaming, a first link to the live room where the second account is livestreaming.

7. The method according to claim 4, wherein the displaying a link to a live room corresponding to the current status of the second account in the chat information display region comprises:

displaying, when the second account is broadcasting, a second link to the live room where the second account is broadcasting.

8. The method according to claim 4, wherein the displaying a link to a live room corresponding to the current status of the second account in the chat information display region comprises:

displaying, when the second account is watching in the live room, a third link to the live room which the second account is watching.

9. The method according to claim 4, further comprising:
displaying, in response to a first operation instruction executed on the link, a live stream image of a live room corresponding to the current status of the second account in the target application.

10. An electronic device, comprising a memory and a processor, a computer program being stored in the memory that, when executed by the processor, causes the electronic device to perform a method for displaying chat information in a target application including:

displaying an application image of the target application selected by a first account that logs into the target application at the electronic device;

displaying a target time-sync comment panel and a target chat panel adjacent the application image, wherein:

the target time-sync comment panel displays time-sync comment information transmitted by a second account watching the target application; and the target chat panel includes an account display region and a chat information display region, the account display region including a friend of the first account, the chat information display region including chat information between the friend and the first account; and in response to receiving a chat request from the first account to the second account displayed in the target time-sync comment panel, adding the second account to the account display region, and replacing the chat information between the friend and the first account with chat information between the first account and the second account in the chat information display region.

11. The electronic device according to claim 10, wherein the method further comprises:

displaying a current status of the second account at the target application; and in response to an operation instruction executed on the current status of the second account, displaying an image corresponding to the current status in the target application, wherein the current status of the second account is displayed at the account display region of the target application.

12. The electronic device according to claim 11, wherein the current status comprises at least one of:

the second account is livestreaming;
the second account is broadcasting; and
the second account is watching a livestream.

13. The electronic device according to claim 11, wherein the method further comprises:

displaying a link to a live room corresponding to the current status of the second account in the chat information display region.

14. The electronic device according to claim 13, wherein the link comprises a title of the live room or a thumbnail of the live room.

15. The electronic device according to claim 13, wherein the displaying a link to a live room corresponding to the current status of the second account in the chat information display region comprises:

displaying, when the second account is livestreaming, a first link to the live room where the second account is livestreaming.

16. The electronic device according to claim 13, wherein the displaying a link to a live room corresponding to the current status of the second account in the chat information display region comprises:

displaying, when the second account is broadcasting, a second link to the live room where the second account is broadcasting.

17. The electronic device according to claim 13, wherein the displaying a link to a live room corresponding to the current status of the second account in the chat information display region comprises:

displaying, when the second account is watching in the live room, a third link to the live room which the second account is watching.

18. The electronic device according to claim 13, wherein the method further comprises:

displaying, in response to a first operation instruction executed on the link, a live stream image of a live room corresponding to the current status of the second account in the target application.

19. A non-transitory computer-readable storage medium storing a computer program that, when executed by a processor of a computer device, causes the electronic device to perform a method for displaying chat information in a target application including:

displaying an application image of the target application selected by a first account that logs into the target application at the electronic device;

displaying a target time-sync comment panel and a target chat panel adjacent the application image, wherein:

the target time-sync comment panel displays time-sync comment information transmitted by a second account watching the target application; and the target chat panel includes an account display region and a chat information display region, the account display region including a friend of the first account, the chat information display region including chat information between the friend and the first account; and in response to receiving a chat request from the first account to the second account displayed in the target time-sync comment panel, adding the second account to the account display region, and replacing the chat information between the friend and the first account with chat information between the first account and the second account in the chat information display region.

20. The non-transitory computer-readable storage medium according to claim 19, wherein the method further comprises:

displaying a current status of the second account at the target application; and in response to an operation instruction executed on the current status of the second account, displaying an image corresponding to the current status in the target application, wherein the current status of the second account is displayed at the account display region of the target application.

21. The non-transitory computer-readable storage medium according to claim 20, wherein the current status comprises at least one of:

the second account is livestreaming;

the second account is broadcasting; and the second account is watching a livestream.

22. The non-transitory computer-readable storage medium according to claim 20, wherein the method further comprises:

displaying a link to a live room corresponding to the current status of the second account in the chat information display region.

* * * * *